US 6,802,574 B2

United States Patent
Ehrmaier et al.

(10) Patent No.: US 6,802,574 B2
(45) Date of Patent: *Oct. 12, 2004

(54) ELECTRONIC CONTROL UNIT AND METHOD FOR THE AUTOMATIC ACTIVATION OF THE PARKING BRAKE IN MOTOR VEHICLES

(75) Inventors: Rudolf Ehrmaier, Munich (DE); Anton Sappler, Munich (DE); Reinhard Schmerer, Pipinsried (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 7 days.

This patent is subject to a terminal disclaimer.

(21) Appl. No.: 09/920,294

(22) Filed: Aug. 2, 2001

(65) Prior Publication Data

US 2002/0023809 A1 Feb. 28, 2002

(30) Foreign Application Priority Data

Aug. 2, 2000 (DE) .......................................... 100 37 576

(51) Int. Cl.[7] ................................................ B60T 7/12
(52) U.S. Cl. .................... 303/16; 188/158; 192/219.4; 307/10.5
(58) Field of Search ............................ 188/105, 106 R, 188/106 P, 106 F, 110, 156, 158, 159; 303/3, 15, 16, 20, 89; 192/219.4; 701/112; 307/10.4, 10.5, 10.6

(56) References Cited

U.S. PATENT DOCUMENTS

| 3,593,815 | A | * | 7/1971 | Inoue ........................ 180/271 |
| 3,978,946 | A | * | 9/1976 | Ream ........................ 188/170 |
| 3,985,210 | A | * | 10/1976 | Hodge et al. ............... 188/170 |
| 4,561,527 | A | * | 12/1985 | Nakamoto et al. ......... 188/2 D |
| 4,691,801 | A | * | 9/1987 | Mann et al. ................ 180/287 |
| 5,067,366 | A | * | 11/1991 | Gandiglio ............... 188/106 P |
| 6,119,837 | A | * | 9/2000 | Tschurbanoff et al. .. 191/12.2 A |
| 6,213,259 | B1 | * | 4/2001 | Hanson et al. ............. 188/156 |
| 6,279,692 | B1 | * | 8/2001 | Siepker et al. ............. 188/105 |

FOREIGN PATENT DOCUMENTS

| DE | 3909907 A1 | * | 9/1990 |
| DE | 19801064 A1 | * | 7/1999 |
| DE | 198 58 543 A1 | | 6/2000 |
| WO | WO-0037836 A1 | * | 6/2000 |

OTHER PUBLICATIONS

Patent application Publication US 2002/0024258 to Ehrmaier et al.*

* cited by examiner

Primary Examiner—Christopher P. Schwartz
(74) Attorney, Agent, or Firm—Crowell & Moring LLP

(57) ABSTRACT

An electronic control unit is provided for automatically activating a parking brake in dependence of at least one specified operating parameter or operating mode of a motor vehicle, which can be started without a mechanical key. The operating mode for the basic automatic activation of the parking lock is the fact that the internal combustion engine is shut off.

4 Claims, 3 Drawing Sheets

ELECTRONIC CONTROL UNIT AND METHOD FOR THE AUTOMATIC ACTIVATION OF THE PARKING BRAKE IN MOTOR VEHICLES

CROSS-REFERENCE TO RELATED APPLICATIONS

This application is related to co-pending U.S. patent application Ser. No. 09/920,293, entitled "Electronic Control Unit for Automatically Activating a Parking Brake and Method for Preventing the Automatic Activation of the Parking Brake in Motor Vehicles".

BACKGROUND AND SUMMARY OF THE INVENTION

This application claims the priority of German Application No. 100 37 576.6, filed Aug. 2, 2000, the disclosure of which is expressly incorporated by reference herein.

The invention relates to an electronic control unit and method for the automatic activation of a parking brake in a motor vehicle.

From German patent document DE 196 25 019 A1, for example, an electronic control unit is known in the form of a transmission control device, which in addition to other vehicle functions is used for automatically activating a parking brake in a vehicle. The parking brake is automatically activated independent of at least one specified operating mode of the motor vehicle, which is started with a mechanical ignition key. Such an operating state can include, e.g., falling short of a certain vehicle speed threshold, the position of the ignition key in the lock, and/or the state of the vehicle door (open/closed). At the latest, upon removing the ignition key from the lock, however, the parking brake is activated.

In the future, key-less access and/or driving authorization systems will be used increasingly in order to start motor vehicles. Such a system is known, for example, from the electronic authorization verification device from German Patent documents DE 198 01 064 A1 and DE 198 23 707 A1. Here, wireless code transmission takes place to establish the access and driving authorization. A mechanical ignition key is only provided as a redundant feature. The vehicle is then started and turned off with a rotary switch with simultaneous verification of the authorization through the authorization verification device. After shutting the vehicle off, no mechanical key, therefore, has to be pulled out of the ignition.

Nevertheless, automatic activation of a parking brake with a removed key, wherein an electronic authorization verification device should be considered equal to a conventional key system from a functional point of view, is required by law in some countries. For safety reasons, on vehicles without mechanical keys, the parking brake is therefore automatically activated independently of a key position in dependence of at least one other operating parameter or operating state. Operating parameters or signals that indicate the user has left the vehicle in particular are evaluated, such as an open driver's door (can be interrogated with a switch in the door) or an empty driver's seat (can be recognized with seat occupation sensors).

The goal of the invention is to define an optimal operating mode at which the parking brake is activated automatically.

This goal is achieved by an electronic control unit and method for automatically activating a parking brake in dependence of at least one specified operating parameter or operating mode of a motor vehicle, which can be started without a mechanical key. The operating mode for a basic automatic activation of the parking lock is the fact that the internal combustion engine is being shut off. Beneficial embodiments of the invention are the objects of the dependent patent claims.

Other objects, advantages and novel features of the present invention will become apparent from the following detailed description of the invention when considered in conjunction with the accompanying drawings.

DETAILED DESCRIPTION OF THE DRAWING

If, as an exception, e.g., the parking brake is not supposed to be engaged with these operating parameters or operating modes, then the driver must first consciously signal this via his actions. For this purpose, means 16, 18 that are actuated directly or indirectly by the driver are provided. These means interact with the electronic control unit 20 for the automatic activation of the parking brake 12. These means preferably cause a function that is comparable to leaving a mechanical ignition key in the lock.

In accordance with a first possibility, a key button 16 that must be directly manually actuated, such as in the form of an OFF switch, is connected with the electronic control unit 20 for the arbitrary prevention of the automatic activation of the parking brake. The driver actuates the OFF switch, which turns off, for example, the electronic access/driving authorization system. This means, e.g., that an authorization verification device (e.g. wireless communicating magnetic card) is deactivated. Therefore, the vehicle can no longer be locked either. The function of this electronic access and/or driving authorization system is assigned, for example, to a memory within the vehicle (similar to the memory known from German Patent document DE 198 23 707 A1, which is additionally fastened in a shaft), which remains in the vehicle. The function of the electronic "key" therefore remains in the vehicle. This corresponds to leaving a key in the ignition, which naturally causes the driver to stay particularly alert. The driver preferably receives a notification that the parking brake is not now engaged and that the vehicle cannot be locked with the electronic "key". Furthermore, in this situation, for example, removal of the memory within the vehicle can lead to an automatic activation of the parking brake and cause the vehicle to be locked. Such an OFF key button (e.g. OFF switch) can be provided, e.g., freely accessible in the dashboard, the center console, the inside roof lining, or on the memory within the vehicle and can be equipped with an appropriate symbol. By actuating the OFF switch again, the described function can be deselected to prevent activation of the parking brake. De-selection of the described function, however, can also be performed automatically with a specified logic, e.g., through a query of the door contacts and the seat occupation or when starting the engine.

Figure 1:
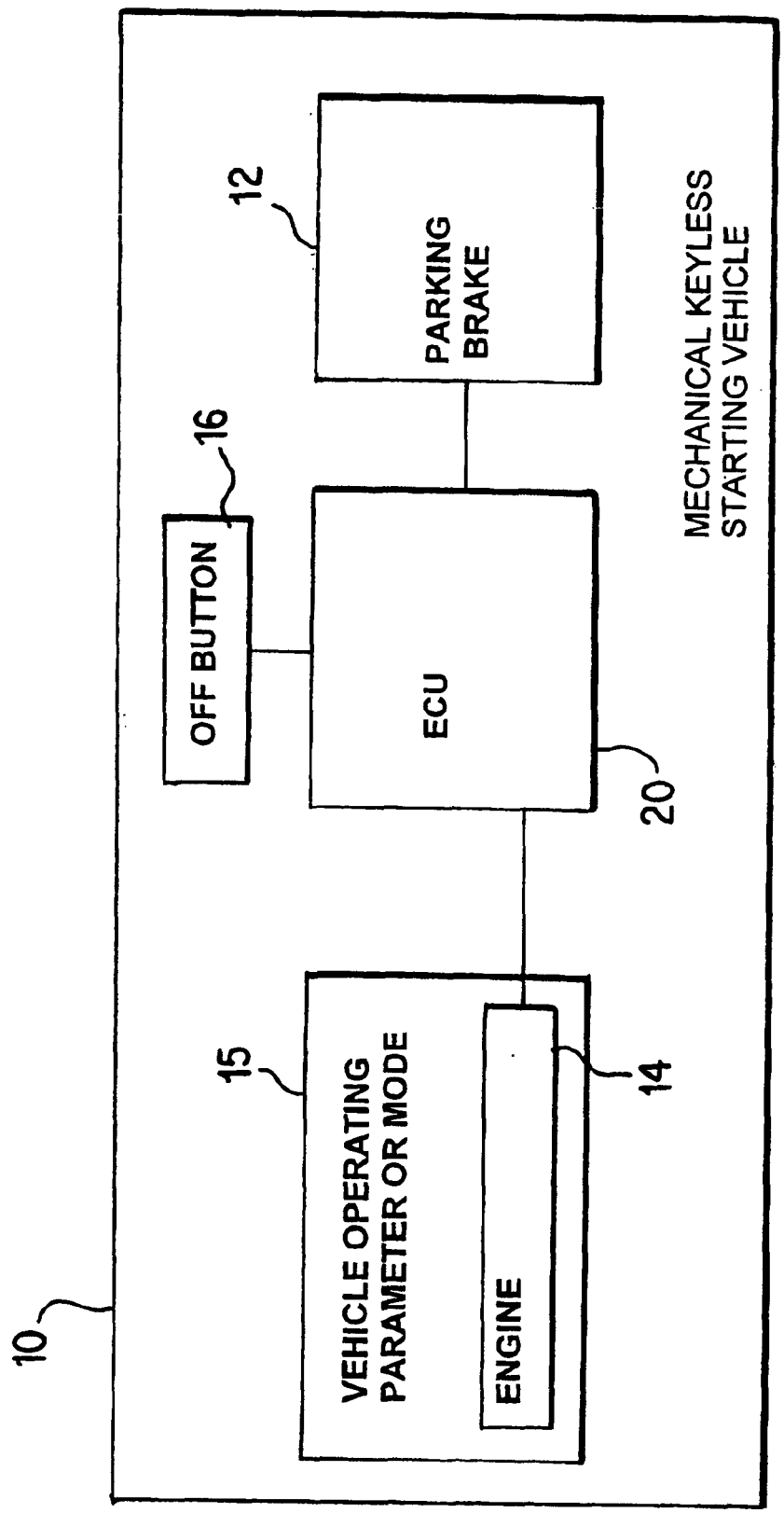
FIG. 1 is a schematic block diagram of the apparatus according to the present invention.
Figure 2:
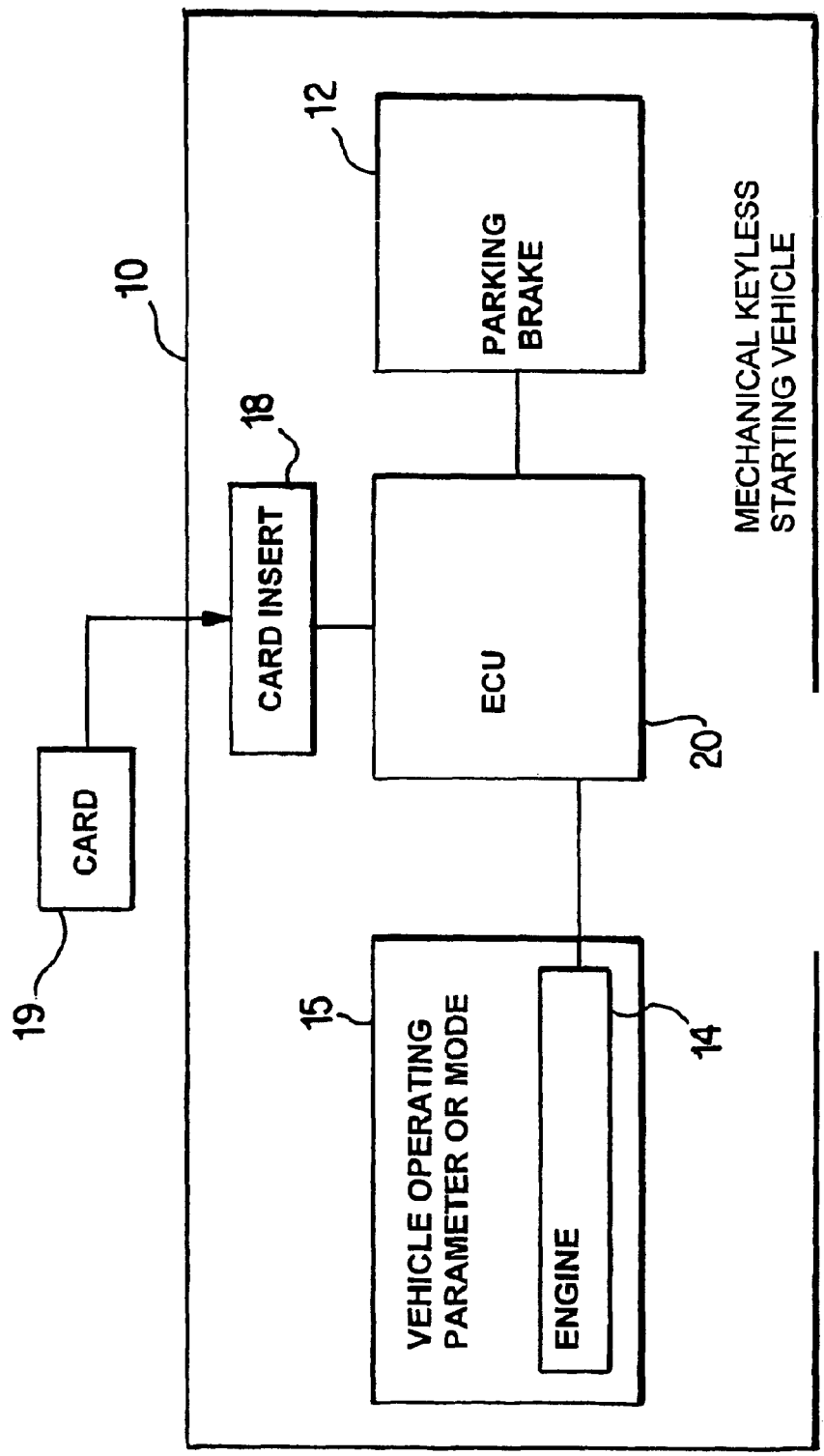
FIG. 2 is a schematic block diagram of a second embodiment according to the present invention.
Figure 3:
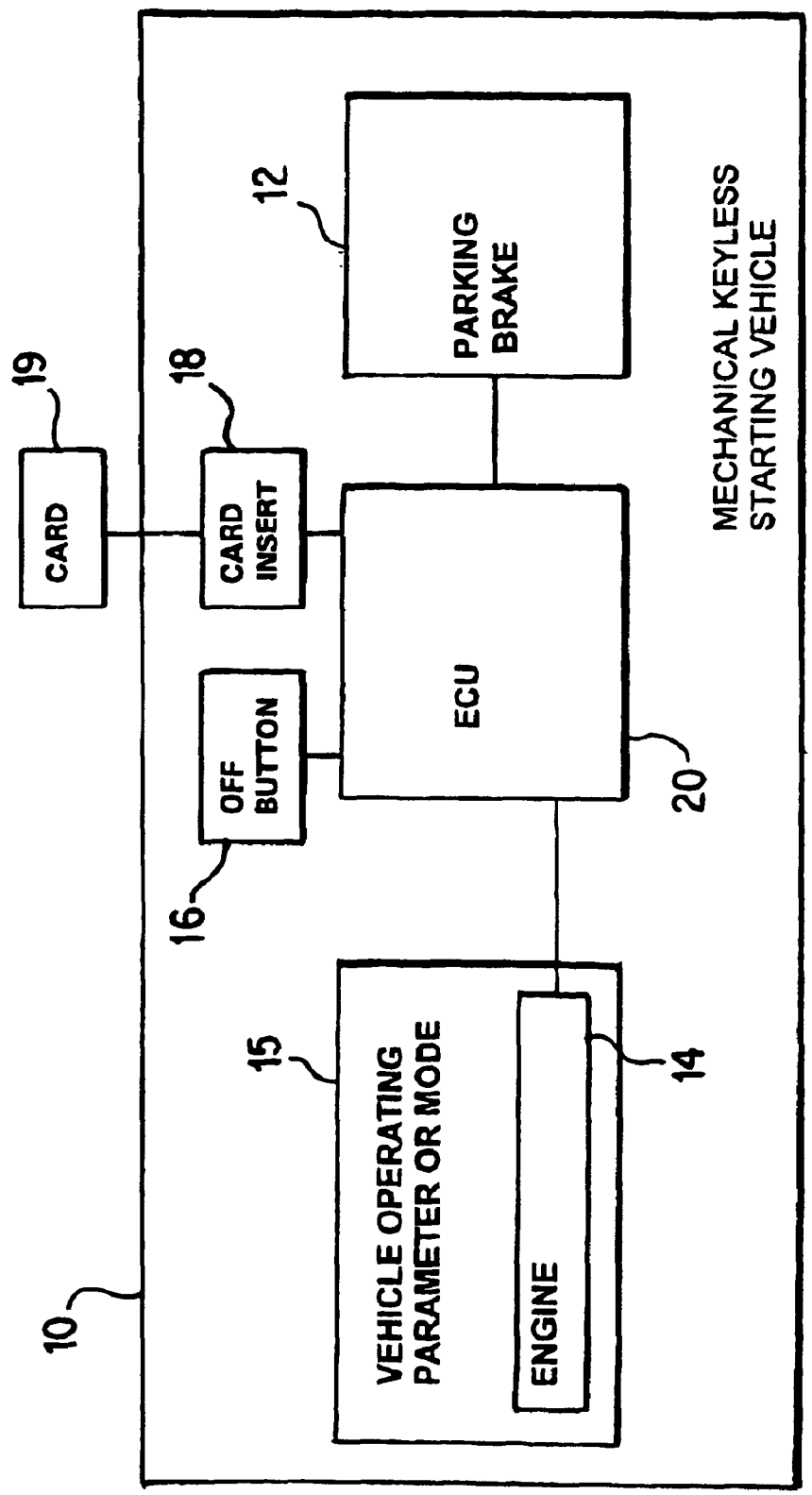
FIG. 3 is a schematic black diagram of another embodiment according to the present invention.

Referring to FIG. 2. in accordance with a second possibility, based on which the motor vehicle can be started with an electronic authorization verification device with a wireless code transmission, the arbitrary prevention of the automatic activation of the parking brake can be triggered by inserting the authorization verification device in a holding shaft 18 provided for this purpose. For example, a switch is indirectly manually actuated when the authorization verification device is inserted in the holding shaft (card insert) 18. Such an authorization verification device can be a magnetic card 19, for example. A holding shaft that is already provided for another module can be used, for example. In the case of an authorization verification device in accordance with German Patent document DE 198 23 707 A1, the authorization verification device, e.g., in the form of a magnetic card, can be inserted into the shaft of the device to hold additional memory after prior removal. Such an electronic "key", e.g., in the form of a magnetic card, a transponder or additional memory, must, therefore, be stored at a specified location on the vehicle. This function also corresponds to leaving the key in the ignition.

Based on this invention, an electronic access and driving authorization system can be combined comfortably with the requirements of the function known under the term 'key interlock'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic control unit for automatically activating a parking brake in a motor vehicle startable without a mechanical key, wherein said electronic control unit automatically activates the parking brake in dependence on at least one specified operating parameter of the motor vehicle, said at least one specified operating parameter for the automatic activation of the parking brake being a shutting-off of an internal combustion engine of the motor vehicle; wherein said electronic control unit includes:

an electronic authorization verification device having a wireless code transmission operatively arranged in the motor vehicle to start the motor vehicle; and a holding shaft in which the authorization verification device is inserted by the user for triggering arbitrarily the prevention of the automatic activation of the parking brake when said activation would otherwise occur based on the shutting-off of the engine.

2. The electronic control unit according to claim 1, further comprising a key button, connected with said electronic control unit, said key button being directly manually actuatable in the form of an OFF switch for arbitrarily preventing the automatic activation of the parking brake.

3. A method for automatically activating a parking brake in a motor vehicle startable without a mechanical key, the method comprising the acts of:

determining an operating mode in which an internal combustion engine of the motor vehicle is being shut-off; and automatically activating the parking brake in dependence on the determined operating mode, said parking brake being automatically activated when the internal combustion engine is being shut-off;

inserting an authorization verification device having a wireless code transmission into a holding shaft in the motor vehicle, said inserting act triggering arbitrarily the prevention of the automatic activation of the parking brake when said activation would otherwise occur based on the engine being shut-off.

4. The method according to claim 3, further comprising the act of preventing arbitrarily the automatic activation of the parking brake by directly manually actuating an OFF switch in the form of a key button for triggering arbitrarily the prevention of the automatic activation of the parking brake.

\* \* \* \* \*